United States Patent
Ryu et al.

(10) Patent No.: US 10,700,878 B1
(45) Date of Patent: Jun. 30, 2020

(54) PHYSICAL UNCLONABLE FUNCTION CODE GENERATION APPARATUS AND METHOD THEREOF

(71) Applicant: Winbond Electronics Corp., Taichung (TW)

(72) Inventors: Douk-Hyoun Ryu, San Jose, CA (US); Seow Fong Lim, San Jose, CA (US)

(73) Assignee: Winbond Electronics Corp., Taichung (TW)

(*) Notice: Subject to any disclaimer, the term of this patent is extended or adjusted under 35 U.S.C. 154(b) by 0 days.

(21) Appl. No.: 16/571,200

(22) Filed: Sep. 16, 2019

(51) Int. Cl.
*H04L 9/32* (2006.01)
*G11C 13/00* (2006.01)

(52) U.S. Cl.
CPC .......... *H04L 9/3278* (2013.01); *G11C 13/004* (2013.01); *G11C 13/0069* (2013.01)

(58) Field of Classification Search
CPC .. G11C 13/004; G11C 13/0069; H04L 9/3278
See application file for complete search history.

(56) References Cited

U.S. PATENT DOCUMENTS

| | | | | |
|---|---|---|---|---|
| 9,276,583 B1* | 3/2016 | Satpathy | .......... | H03K 19/17768 |
| 10,103,895 B1* | 10/2018 | Tseng | ................ | G11C 13/0059 |
| 10,424,380 B1* | 9/2019 | Li | .......................... | H04L 9/3278 |
| 2017/0077046 A1* | 3/2017 | Gupta | .................. | H01L 27/0207 |
| 2018/0091300 A1* | 3/2018 | Tomishima | ............ | G11C 29/50 |
| 2018/0337793 A1* | 11/2018 | Park | ....................... | H04L 9/3278 |
| 2019/0079878 A1* | 3/2019 | Chen | ................... | G06F 12/1408 |
| 2019/0190725 A1* | 6/2019 | De | ......................... | H04L 9/3278 |
| 2019/0252016 A1* | 8/2019 | Rodriguez | .......... | G11C 11/2275 |
| 2019/0304527 A1* | 10/2019 | Kim | ...................... | G11C 11/161 |
| 2019/0305971 A1* | 10/2019 | Li | .......................... | G11C 11/412 |

\* cited by examiner

Primary Examiner — Alexander H Taningco
Assistant Examiner — Kurtis R Bahr
(74) Attorney, Agent, or Firm — JCIPRNET

(57) ABSTRACT

A PUF code generation apparatus that includes a reference generator, a PUF information generation and storage array, a sensing amplifier and a writing driver is introduced. The PUF information generation and storage array includes a plurality of first memory cells each including a PUF information providing element and a PUF information storage element. The sensing amplifier compares a plurality of first electrical values read from the PUF information providing elements to a reference generated from the reference generator to generate a plurality of PUF information. The writing driver performs a write-back operation on the PUF information storage elements according to the plurality of PUF information. The sensing amplifier reads a plurality of second electrical values of the PUF information storage elements to generate a sensing result and output a PUF code according to the sensing result.

19 Claims, 5 Drawing Sheets

PHYSICAL UNCLONABLE FUNCTION CODE GENERATION APPARATUS AND METHOD THEREOF

BACKGROUND OF THE INVENTION

1. Field of the Invention

The disclosure relates to physical unclonable function (PUF), and particularly relates to a method and a PUF code generation apparatus that are capable of generating the PUF code with a high level of the randomness and uniqueness.

2. Description of Related Art

A physical unclonable function (PUF) may be used to generate a random code based on physical variations occurred during a manufacturing process. Since the physical variations during the manufacturing process is random and unpredictable, the random code generated by PUF is random and unique. The PUF may be applied in a wide range of applications such as device identity, security, authentication.

As demand for PUF has grown recently, there has grown a need for a creative design that effectively generate the PUF code.

SUMMARY OF THE INVENTION

This disclosure introduces a physical unclonable function (PUF) code generation apparatus and a method thereof that are capable of generating the PUF code with a high level of the randomness and uniqueness.

The PUF code generation apparatus includes a reference generator, a PUF information generation and storage array, a sensing amplifier and a writing driver. The reference generator is configured to generate a reference. The PUF information generation and storage array includes a plurality of first memory cells each including a PUF information providing element and a PUF information storage element. The sensing amplifier is coupled to the PUF information generation and storage array and is configured to compare a plurality of first electrical values read from the PUF information providing elements to the reference so as to generate a plurality of PUF information. The writing driver is configured to perform a write-back operation on the PUF information storage elements according to the plurality of PUF information. The sensing amplifier is further configured to read a plurality of second electrical values of the PUF information storage elements so as to generate a sensing result and output a PUF code according to the sensing result. The PUF information providing element includes a volatile memory element, and the PUF information storage element includes a non-volatile memory element.

The method of generating a PUF code is adapted to a PUF code generation apparatus having a PUF information generation and storage array and a reference generator. The method includes steps of generating a reference from the reference generator; sensing a plurality of first electrical values from PUF information providing elements of a plurality of first memory cells included in the PUF information generation and storage array; comparing the plurality of first electrical values to the reference so as to generate a plurality of PUF information; performing a write-back operation on the PUF information storage elements according to according to the plurality of PUF information; reading a plurality of second electrical values of the PUF information storage elements so as to generate a sensing result; and outputting the PUF code according to the sensing result, wherein PUF information storage element includes a non-volatile memory element.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

It is to be understood that other embodiment may be utilized and structural changes may be made without departing from the scope of the present invention. Also, it is to be understood that the phraseology and terminology used herein are for the purpose of description and should not be regarded as limiting. Unless limited otherwise, the terms "coupled" herein are used broadly and encompass direct and indirect connections or couplings.

Figure 1:
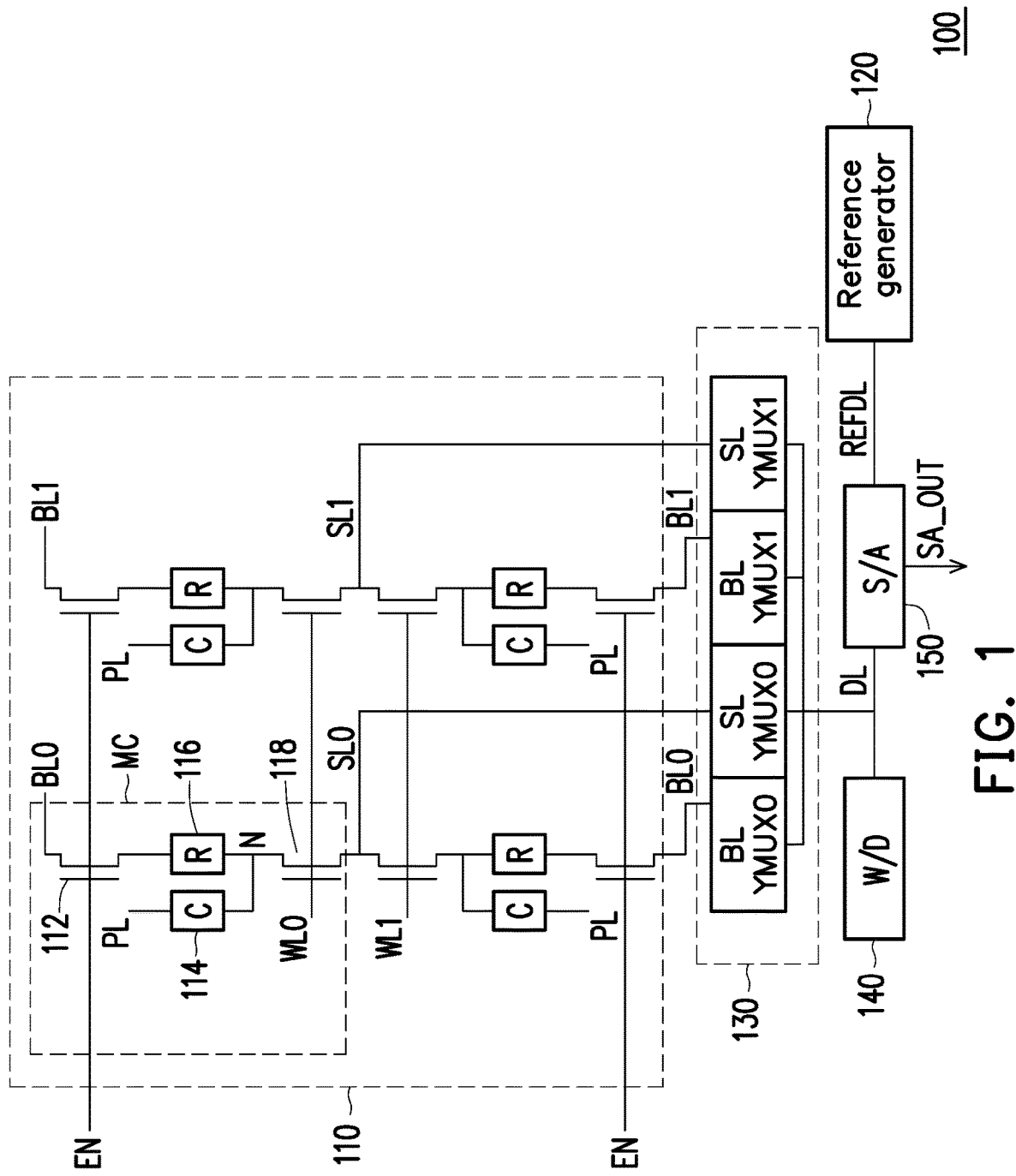
FIG. 1 is a schematic diagram illustrating a PUF code generation apparatus in accordance with an embodiment of the disclosure.

Referring to FIG. 1, a PUF code generation apparatus 100 includes a PUF information generation and storage array 110, a reference generator 120, a decoder 130, a writing driver 140 and a sense amplifier 150. The PUF information generation and storage array 110 includes a plurality of memory cells MC, in which each of the memory cells MC of the PUF information generation and storage array 110 may be coupled to a bit line, a source line, and a word line. For example, one of the memory cells MC in FIG. 1 is coupled to a bit line BL0, a source line SL0, and a word line WL0. Besides, the plurality of memory cells MC are commonly coupled to a plate line PL. Each of the memory cells MC includes a PUF information providing element 114 including a volatile memory element, a PUF information storage element 116 including a non-volatile memory element, and two transistors 112 and 118 for controlling assessing the PUF information providing element 114 and the PUF information storage element 116, respectively.

Because of the physical variations during the manufacturing process of the PUF information generation and storage array 110, electrical values read from the PUF information providing elements 114 are unique and random that can be used for generating PUF information. In an embodiment, the PUF information providing element 114 may include a capacitor (represented by "C") and the PUF information storage element 116 may include a memristor element (represented by "R").

In the present embodiment, a resistance state of the memristor element R may represent the PUF information provided by the capacitor C that is stored in the memory cell MC. For example, a high-resistance state (HRS) of the memristor element R represents a logic value of "0", and a low-resistance state (LRS) of the memristor element R represents a logic value of "1". The PUF information storage element 116 is coupled between the transistors 112 and 118. The transistor 112 is coupled between the bit line and the PUF information storage element 116, in which a control terminal of the transistor 112 receives an enable signal EN. The PUF information storage element 116 is able to be accessed in response to the enable signal EN. The transistor 118 is coupled between the PUF information storage element 116 and the source line, in which a control terminal of the transistor 118 is coupled to the word line of the memory cell MC. The PUF information providing element 114 is coupled between the plate line PL and a connection node N between the PUF information storage element 116 and the transistor 118.

Figure 3:
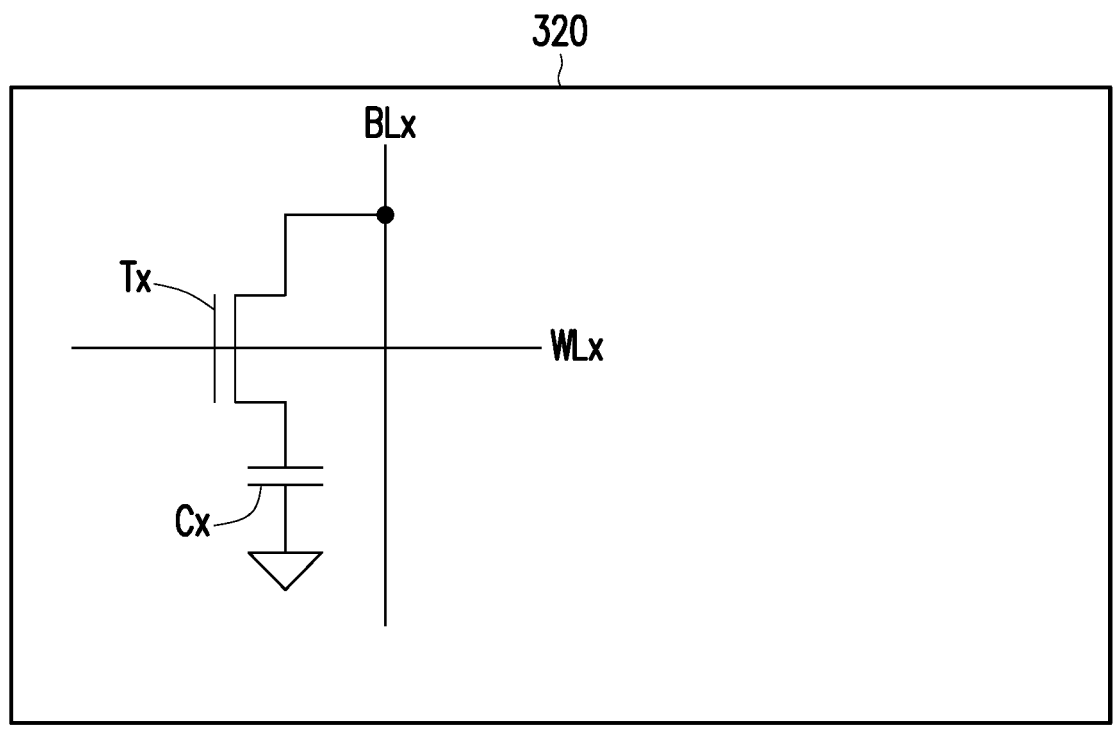
FIG. 3 is a schematic diagram illustrating a memory array in accordance with an embodiment of the disclosure.

The reference generator 120 may include a plurality of memory cells arranged in a matrix form. Each memory cell of the reference generator 120 includes a volatile memory element and a transistor. In some embodiments, the memory cells of the reference generator 120 are 1T1C memory cells, as shown in FIG. 3, each of the 1T1C memory cells includes a transistor Tx and a capacitor Cx, and each of the 1T1C memory cells is coupled to a bit line BLx and a word line WLx.

It is noted that the disclosure does not limit a size of the reference generator 120 to any specific number. The reference generator 120 could be a 4×4 memory array in an embodiment, and or any n×n memory array another embodiment, wherein n is a natural number. In addition, the disclosure does not limit the memory cell of the reference generator 120 to be consisted of 1T1C. A type and a structure of cells in the PUF information generation and storage array 110 and the reference generator 120 may be changed according to designed needs. In an alternative embodiment which is not shown, each memory cell of the reference generator 120 can be consisted of the volatile memory element used in the PUF information generation and storage array 110.

The decoder 130 may be configured to decode selected locations (addresses) of the memory cells MC in the PUF information generation and storage array 110. In some embodiments, the decoder 130 may include a plurality of multiplexers SL_YMUX0, BL_YMUX0, BL_YMUX1, SL_YMUX1 that are configured to select bit lines and source lines associated with the memory cells MC of the PUF information generation and storage array 110. The writing driver 140 and the sensing amplifier 150 perform a write-back operation and a sense operation, respectively, on the memory cells MC of the PUF information generation and storage array 110 through the decoder 130.

In some embodiments, the sense amplifier 150 is configured to receive information from the PUF information generation and storage array 110 and the reference generator 120 via a data line DL and a reference data line REFDL, respectively, so as to generate a plurality of PUF information. In the present embodiment, the sense amplifier 150 may sense a capacitance value provided by the capacitor C, i.e. the PUF information providing element 114, of a selected memory cell MC in the PUF information generation and storage array 110 via the data line DL and compare it with a reference obtained from the reference data line REFDL to generate the plurality of PUF information. A logic element (not shown) may be coupled between the reference generator 120 and the sense amplifier 150 to calculate an average of the capacitance values sensed from the 1T1C memory cells of the reference generator 120, and provide the average to the reference data line REFDL. In such situation, the reference is the average of the capacitance values sensed from the 1T1C memory cells of the reference generator 120. However, the invention is not limited thereto, in an alternative embodiment which is not shown, the reference may be a value sensed from a selected memory cell of the reference generator 120. In another alternative embodiment, the reference may be a value obtained by calculating the sensing results of a group of selected memory cells of the reference generator 120.

In some embodiments, the writing driver 140 is configured to perform a write-back operation on the PUF information storage element 116 of a selected memory cell MC in the PUF information generation and storage array 110 based on the plurality of PUF information. In some embodiments, the PUF information provided by the PUF information providing element 14 located at address A will be written back to the PUF information storage element 16 located at address A. In some embodiments, to increase the randomness applied in high security devices, a random generator (not shown) can be coupled between the writing driver 140 and the decoder 130, so as to perform a random math operation on the address A of the PUF information providing element 14 to generate an address B. Therefore, the PUF information provided by the PUF information providing element 14 located at address A will be written back to the PUF information storage element 16 located at address B. The write-back operation may include a set operation or a reset operation, so as to write the logic value of "1" or "0" in the selected PUF information storage element 116 in response to the set and reset operations, respectively. The sense amplifier 150 may further sense logic values of the PUF information storage elements 116 in the PUF information generation and storage array 110 after the write-back operation has been done, so as to generate a sensing result and then output a sensing output result SA_OUT serving as a PUF code according to the sensing result.

Figure 2:
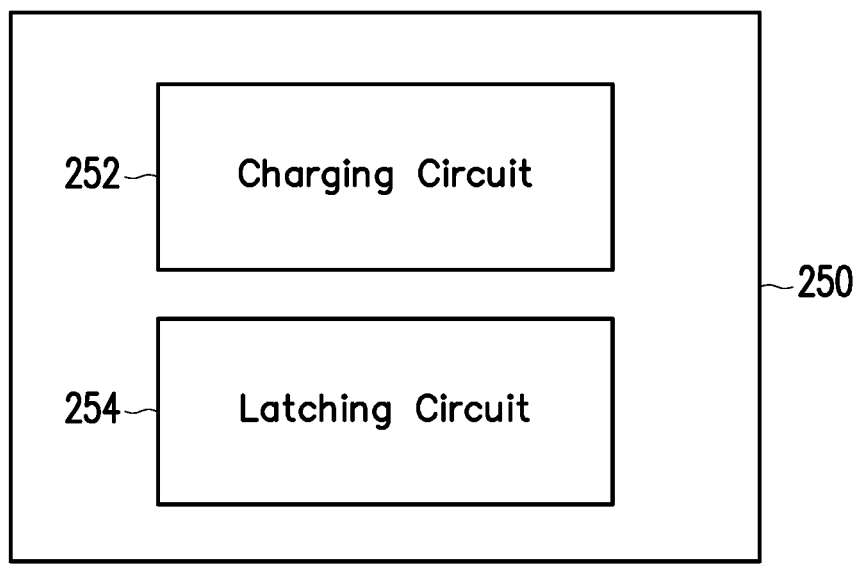
FIG. 2 is a schematic diagram illustrating a sensing amplifier in accordance with an embodiment of the disclosure.

Referring to FIG. 2, in some embodiments, a sense amplifier 250 which is similar to the sense amplifier 150 in FIG. 1 may further include a charging circuit 252 and a latching circuit 254. The charging circuit 252 is configured to perform a charging operation to charge the memory cells MC of the PUF information generation and storage array 110 and the memory cells of the reference generator 120. The latching circuit 254 is configured to latch the plurality of PUF information. The writing driver 140 performs the write-back operation according to the output of the latching circuit 254.

In some embodiments, the charging circuit 252 and the latching circuit 254 may be disposed outside the sense amplifier 250. In other words, the charging circuit 252 and the latching circuit 254 may be disposed anywhere in the PUF code generation apparatus 100.

Figure 4A:
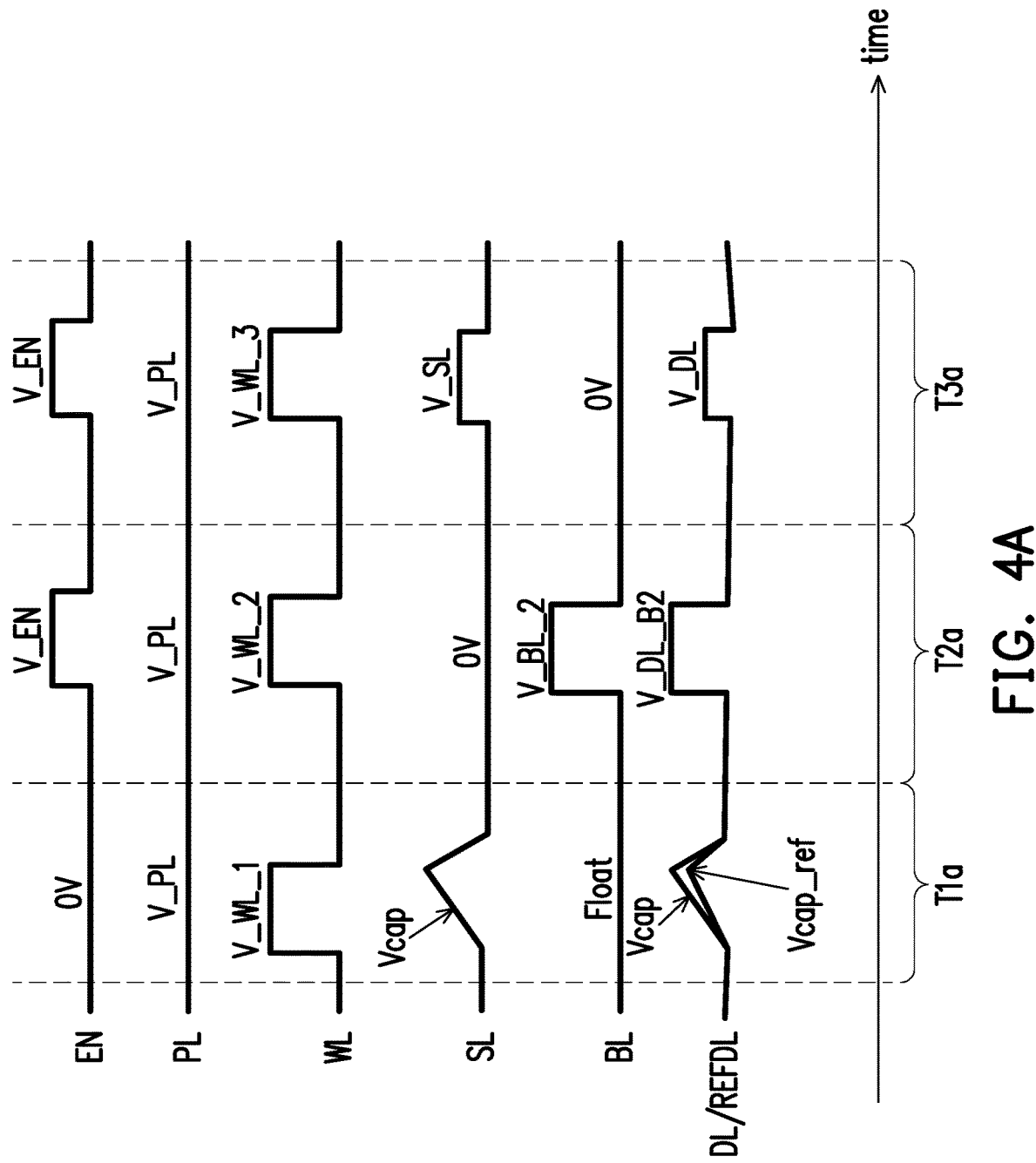
FIG. 4A to FIG. 4B are timing diagrams of a PUF generation operation in accordance with some embodiments of the disclosure.

FIG. 4A is a timing diagram of a PUF generation operation in accordance with an embodiment of the disclosure. In the embodiment, the PUF information providing element 114 may be a capacitor (represented by "C") and the PUF information storage element 116 may be a memristor element (represented by "R"). And, the memory cells of the reference generator 120 are 1T1C memory cells. Referring to FIG. 1 and FIG. 4A, the PUF code generation apparatus 100 performs a sense operation during a period T1a, performs a write-back operation during a period T2a and performs a reading operation during a period T1a. Before performing the sense operation in the time interval T1a, the PUF code generation apparatus 100 may further perform a discharging operation on the memristor elements R of the PUF information generation and storage array 110 and a charging operation on a selected capacitor C of the PUF information generation and storage array 110 and the memory cells of the reference generator 120 via the corresponding transistors connected in series. Particularly, the PUF code generation apparatus 100 performs the discharging operation to discharge the transistors connected in series with the memristor elements R of the PUF information generation and storage array 110 to a reference voltage level (e.g., ground voltage level). The discharging operation may be performed by a discharging circuit (not shown) which could be disposed anywhere in the PUF code generation apparatus 100. Next, the PUF code generation apparatus 100 performs the charging operation to charge the transistors connected in series with the selected capacitor C of the PUF information generation and storage array 110 and the memory cells of the reference generator 120. The charging operation may be performed by a charging circuit (e.g., charging circuit 252 shown in FIG. 2) which may be disposed anywhere in the PUF code generation apparatus 100. It is noted that the capacitance values obtained from the capacitors C of the PUF information generation and storage array 110 after the charging operation may vary randomly and unpredictably, because of the physical variations during the manufacturing process of the PUF information generation and storage array 110.

In the period T1a, the capacitance values of the memory cells in the reference generator 120 are sensed. The capacitance values of the memory cells in the reference generator 120 are then further used to generate the reference which is corresponded to a reference voltage Vcap_ref shown in FIG. 4A on the reference data line REFDL. In this embodiment, the reference is the average of the capacitance values sensed from the memory cells in the reference generator 120.

Also in the period T1a, the capacitance values of the memory cells MC of the PUF information generation and storage array 110 are sensed by the sensing amplifier 150. To sense the capacitance values of the capacitors C in the PUF information generation and storage array 110, the enable signal EN is maintained at a logic low level to disable accessing the PUF information storage elements 116; the bit line BL is floated; and the word line WL is biased by V_WL_1. The capacitance value (corresponding to the capacitance voltage Vcap shown in FIG. 4A) of the selected capacitor C in the PUF information generation and storage array 110 is sensed through the corresponding source line SL. The capacitance voltage Vcap is compared with the reference voltage Vcap_ref; and the write-back operation on the PUF information storage elements 116 of the PUF information generation and storage array 110 in the period T2a is performed according to the comparison result of the capacitance voltage Vcap and the reference voltage Vcap_ref.

In an embodiment, in the period T2a, when the capacitance voltage Vcap is greater than the reference voltage Vcap_ref, the latching circuit 254 outputs a first logic value accordingly, and the write-back operation may include a set operation on the selected memristor element R of the PUF information generation and storage array 110 according to the first logic value output from the latching circuit 254. In an alternative embodiment, in the period T2a, when the capacitance voltage Vcap is greater than the reference voltage Vcap_ref, the latching circuit 254 outputs a second logic value accordingly, and the write-back operation may include a reset operation on the selected memristor element R of the PUF information generation and storage array 110 according to the second logic value output from the latching circuit 254.

In the exemplary embodiment shown in FIG. 4A, the write-back operation is the set operation when the capacitance voltage Vcap is greater than the reference voltage Vcap_ref. To perform the set operation in the period T2a, the logic level of the enable signal EN is switched to be high (e.g., the enable signal EN has a level of V_EN); the word line WL is biased by V_WL_2; the bit line BL is biased by V_BL_2; and the source line SL is biased by the ground voltage level (e.g., 0V). The data line DL is biased by V_DL_B2, and it is connected BL through BL YMUX. As a result, the set operation is performed on the memristor element R of the PUF information generation and storage array 110 in the period T2a.

In the period T3a, the PUF information stored in the memristor element R is read by the sense amplifier 150, so as to output the sensing output result SA_OUT. To read the memristor element R, the enable signal EN is switched to be high; the word line WL is biased by V_WL_3; the source line SL is biased by V_SL; and the bit line BL is biased by the ground voltage level. The data line DL is biased by V_DL. A reading result from the memristor element R is used to generate the PUF code.

Throughout the periods T1a, T2a and T3a, the plate line PL of the memory cell may be biased by a voltage level V_PL.

Figure 4B:
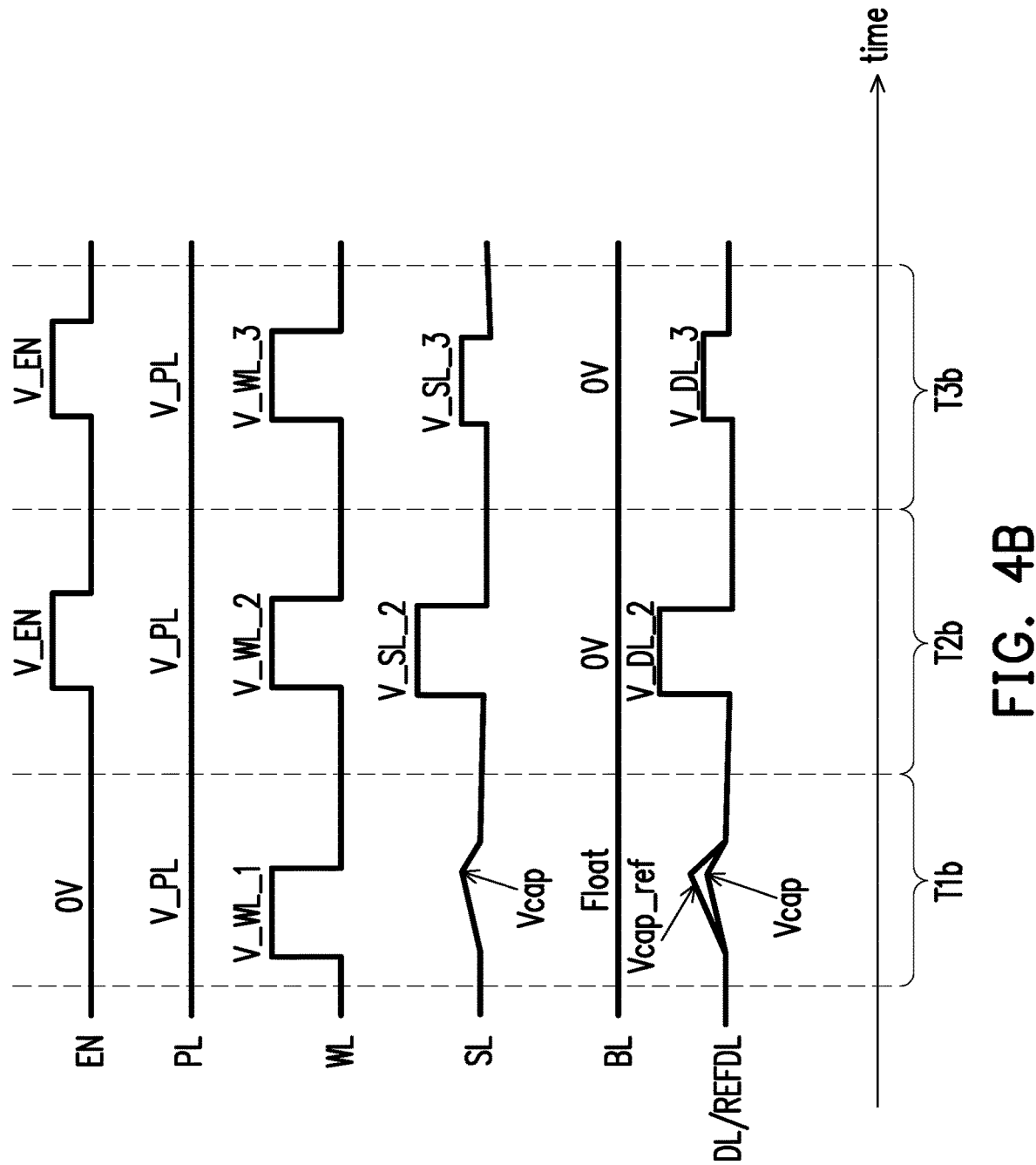

FIG. 4B is a timing diagram of a PUF generation operation in accordance with an embodiment of the disclosure. A difference between FIG. 4A and FIG. 4B is that during a period T1b, the capacitance voltage Vcap (corresponding to a capacitance value sensed from the selected capacitor C in the PUF information generation and storage array 110) is not greater than the reference voltage Vcap_ref (corresponding to the reference obtained from the reference generator 120). As a result, the write-back operation includes a reset operation in the period T2b.

To perform the reset operation during the period T2b, the enable signal EN is switched to be high (e.g., the signal EN has a level of V_EN); the word line WL is biased by V_WL_2; the bit line BL is biased by the ground voltage level (e.g., 0V); and the source line SL is biased by V_SL_2. The data line DL is biased by the V_DL_2. After the reset operation is performed on the memristor element R, a reading operation is performed during the period T3b to read the PUF information stored in the memristor element R. The reading operation in period T3b of FIG. 4B is similar to the reading operation in the FIG. 4A, however, the source line SL is biased by V_SL_3 which is greater than V_SL, and the data line DL is biased by V_DL_3 which is greater than V_DL.

In some embodiments, the PUF code generation apparatus may further perform a write protection operation on the PUF information storage element 116 after the write-back operation has been performed on the PUF information storage element 116, such that the PUF information storage element 116 is set to a no-write status to protect the PUF information storage element 116 from another write operation. In other words, the PUF information storage element 116 of the PUF information generation and storage array 110 is only written once for storing the corresponding PUF information. In some embodiments, a write enable instruction is issued to enable the writing driver 140, after completing the write-back operation, a status register is automatically cleared to store "0" so as to disenable the writing driver 140. In some embodiments, changes to a status register can be enable or disenable by a write protect pin. In some embodiments, block protect bits can be used to determine the scope of the PUF information storage elements 116 to be performed the write protection operation. In some embodiments, the PUF generation operation is performed in the initial power-up of the PUF code generation apparatus (e.g., the first time that the PUF code generation apparatus is powered up).

Figure 5:
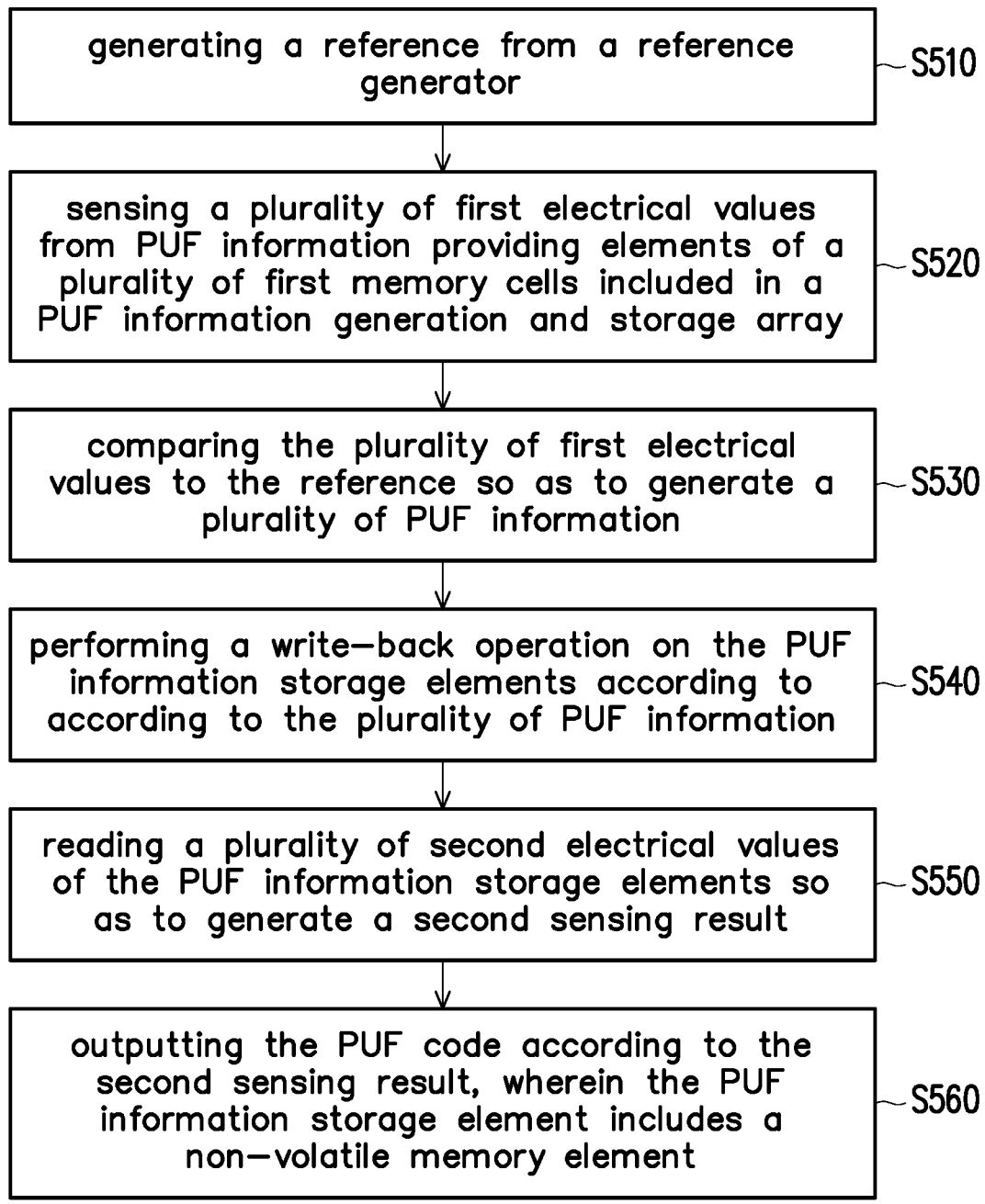
FIG. 5 is a flowchart diagram illustrating a method of generating a PUF code in accordance with an embodiment of the disclosure.

Referring to FIG. 5, a method of generating a PUF code adapted to a PUF code generation apparatus having a PUF information generation and storage array and a reference generator in accordance with an embodiment of the disclosure is illustrated. In step S510, a reference is generated from the reference generator. In step S520, a plurality of first electrical values are sensed from PUF information providing elements of a plurality of first memory cells included in the PUF information generation and storage array. In step S530, the plurality of first electrical values are compared to the reference so as to generate a plurality of PUF information. In step S540, a write-back operation is performed on the PUF information storage elements according to the plurality of PUF information. In step S550, a plurality of second electrical values of the PUF information storage elements are read so as to generate a sensing result. In step S560, the PUF code is outputted according to the sensing result, in which the PUF information storage element includes a non-volatile memory element.

In summary, in some embodiments of the disclosure, a discharging operation is performed to first memory cells of a PUF information generation and storage array and second memory cells of a reference generator. Next, a charging operation is performed to the first memory cells and the second memory cells. A plurality of first electrical values read from the PUF information providing elements are compared to the reference so as to generate a plurality of PUF information. As a result of physical variations, the first electrical values read from the PUF information providing elements are random. A write-back operation is performed on the PUF information storage elements according to the plurality of PUF information; and a plurality of second electrical values of the PUF information storage elements are read so as to generate a sensing result. A PUF code is outputted according to the sensing result. In this way, the PUF code generated by the above operations has a high level of randomness and uniqueness.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A physical unclonable function (PUF) code generation apparatus, comprising:
   a reference generator, configured to generate a reference;
   a PUF information generation and storage array, comprising a plurality of first memory cells each including a PUF information providing element and a PUF information storage element;
   a sensing amplifier, coupled to the PUF information generation and storage array, and configured to compare a plurality of first electrical values read from the PUF information providing elements to the reference so as to generate a plurality of PUF information;
   a writing driver, configured to perform a write-back operation on the PUF information storage elements according to the plurality of PUF information, wherein the sensing amplifier is further configured to read a plurality of second electrical values of the PUF information storage elements so as to generate a sensing result and output a PUF code according to the sensing result,
   wherein the PUF information providing element includes a volatile memory element, and the PUF information storage element includes a non-volatile memory element.

2. The PUF code generation apparatus of claim 1, further comprising:
   a latching circuit, configured to latch the plurality of PUF information,
   wherein the writing driver performs the write-back operation according to the output of the latching circuit.

3. The PUF code generation apparatus of claim 2, wherein
   the latching circuit outputs a first logic value when the first electrical value read from a selected one of the PUF information providing elements is greater than the reference;
   the latching circuit outputs a second logic value when the first electrical value read from the selected one of the PUF information providing elements is not greater than the reference;
   the write-back operation performs a first operation to a selected one of the plurality of PUF information storage elements when the latching circuit outputs the first logic value, and
   the write-back operation performs a second operation to the selected one of the plurality of PUF information storage elements when the latching circuit outputs the second logic value.

4. The PUF code generation apparatus of claim 1, wherein after the writing driver performs the write-back operation on the PUF information storage element, the writing driver is further configured to set the PUF information storage element to a no-write status to protect the PUF information storage element from another write operation.

5. The PUF code generation apparatus of claim 1, further comprising:
   a charging circuit, coupled to the PUF information generation and storage array and the reference generator, configured to perform a charging operation to the PUF information generation and storage array and the reference generator,
   wherein the charging circuit performs the charging operation before the sensing amplifier senses the plurality of first electrical values of the plurality of first memory cells.

6. The PUF code generation apparatus of claim 5, wherein the PUF information generation and storage array and the reference generator are discharged to a reference voltage level before the charging circuit performs the charging operation to the PUF information generation and storage array and the reference generator.

7. The PUF code generation apparatus of claim 1, wherein the PUF information providing element comprises a capacitor, the PUF information storage element comprises a memristor element that is coupled between the memristor element and a plate-line of the PUF information generation and storage array,
   each of the plurality of first memory cells further comprises:
   a first transistor, coupled between a bit line of the PUF information generation and storage array and the memristor element, wherein a control terminal of the first transistor receives an enable signal; and a second transistor, coupled between the memristor element and a source line of the PUF information generation and storage array, wherein a control terminal is coupled to a word line of the PUF information generation and storage array, and the reference generator includes a plurality of second memory cells each including the capacitor, and the reference is generated according to capacitance values read from the plurality of second memory cells.

8. The PUF code generation apparatus of claim 7, wherein the reference is obtained by averaging capacitance values sensed from the plurality of the second memory cells of the reference generator.

9. The PUF code generation apparatus of claim 7, wherein the sense amplifier senses the plurality of first electrical value of the plurality of first memory cells when the first transistor is turned off and the second transistor is turned on.

10. The PUF code generation apparatus of claim 1, wherein the sense amplifier senses the plurality of first electrical values of the plurality of first memory cells and the writing driver performs the write-back operation for generating the PUF code when the PUF code generation apparatus is power-up for the first time.

11. The PUF code generation apparatus of claim 1, wherein the writing driver is configured to perform the write-back operation on the PUF information storage element of one of the first memory cells according to the PUF information read from another one of the first memory cells.

12. A method of generating a physical unclonable function (PUF) code, adapted to a PUF code generation apparatus having a PUF information generation and storage array and a reference generator, comprising:

generating a reference from the reference generator;

sensing a plurality of first electrical values from PUF information providing elements of a plurality of first memory cells included in the PUF information generation and storage array;

comparing the plurality of first electrical values to the reference so as to generate a plurality of PUF information;

performing a write-back operation on the PUF information storage elements according to the plurality of PUF information;

reading a plurality of second electrical values of the PUF information storage elements so as to generate a sensing result; and outputting the PUF code according to the sensing result, wherein the PUF information storage element includes a non-volatile memory element.

13. The method of claim 12, further comprising:

outputting a first logic value when the first electrical value read from a selected one of the PUF information providing elements is greater than the reference; and outputting a second logic value when the first electrical value read from the selected one of the PUF information providing elements is not greater than the reference.

14. The method of claim 13, wherein performing the write-back operation comprises:

performing a first operation to a selected one of the plurality of PUF information storage elements when the first logic value is output, and performing a second operation to the selected one of the plurality of PUF information storage elements when the second logic value is output.

15. The method of claim 12, wherein after performing the write-back operation, the method further comprising:

setting the PUF information storage elements which have been performed the write-back operation to a no-write status to protect the PUF information storage elements from another write operation.

16. The method of claim 12, wherein the PUF information providing element comprises a capacitor, the PUF information storage element comprises a memristor element that is coupled between the memristor element and a plate-line of the PUF information generation and storage array, the reference generator includes a plurality of second memory cells each including the capacitor, and the reference is generated according to capacitance values read from the plurality of second memory cells.

17. The method of claim 16, wherein generating the reference from the reference generator includes averaging capacitance values sensed from the plurality of the second memory cells of the reference generator.

18. The method of claim 12, further comprising:

performing a discharging operation to discharge the PUF information generation and storage array and the reference generator to a reference voltage level; and performing a charging operation to the PUF information generation and storage array and the reference generator.

19. The method of claim 12, wherein the plurality of first electrical values of the plurality of first memory cells are sensed and the write-back operation is performed for generating the PUF code when the PUF code generation apparatus is power-up for the first time.

* * * * *